United States Patent
Dietz et al.

(10) Patent No.: US 11,282,123 B2
(45) Date of Patent: Mar. 22, 2022

(54) METHODS AND SYSTEMS FOR PROVIDING MEDIA ASSET RECOMMENDATIONS BASED ON DISTRIBUTED BLOCKCHAIN ANALYSIS

(71) Applicant: Rovi Guides, Inc., San Jose, CA (US)

(72) Inventors: Todd Dietz, North Wales, PA (US); Jared Grove, Ardmore, PA (US); Evangeline Castaneda, West Chester, PA (US); Brandon Conley, Wynnewood, PA (US)

(73) Assignee: Rovi Guides, Inc., San Jose, CA (US)

( * ) Notice: Subject to any disclaimer, the term of this patent is extended or adjusted under 35 U.S.C. 154(b) by 1029 days.

(21) Appl. No.: 15/940,597

(22) Filed: Mar. 29, 2018

(65) Prior Publication Data
US 2019/0306549 A1    Oct. 3, 2019

(51) Int. Cl.
| | |
|---|---|
| *H04N 21/25* | (2011.01) |
| *H04L 9/06* | (2006.01) |
| *G06F 21/44* | (2013.01) |
| *G06Q 20/38* | (2012.01) |
| *G06F 16/27* | (2019.01) |
| *G06Q 30/06* | (2012.01) |

(Continued)

(52) U.S. Cl.
CPC ......... *G06Q 30/0631* (2013.01); *G06F 21/44* (2013.01); *G06Q 20/1235* (2013.01); *G06Q 20/389* (2013.01); *G06Q 20/3823* (2013.01); *G06Q 30/0255* (2013.01); *H04N 21/251* (2013.01); *G06F 16/27* (2019.01); *G06F 21/10* (2013.01); *G06Q 2220/10* (2013.01); *H04L 9/0637* (2013.01); *H04L 2463/101* (2013.01); *H04N 21/466* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |

(Continued)

OTHER PUBLICATIONS

Detho—Developing a system for securely time-stamping and visualizing the changes made to online news content arXiv: 1802.07285 [cs.DL] (Year: 2018).*

(Continued)

*Primary Examiner* — Jacob C. Coppola
*Assistant Examiner* — Eduardo Castilho
(74) *Attorney, Agent, or Firm* — Haley Guiliano LLP

(57) ABSTRACT

Systems and methods are described for providing media recommendation to a user based on analyzing a blockchain ledger. A user interest score that represents interest of the user in media assets associated with a first keyword is stored. A blockchain ledger is accessed. The blockchain ledger includes multiple blocks, each block identifying: (1) a media asset; (2) a seller user; and (3) buyer user. A blockchain ledger is searched to find a block that: (1) identifies a first media asset that comprises metadata which includes the first keyword; and (2) identifies the user as the seller. The user interest score is then reduced based on such a block being found. A media asset recommendation is then provided to the user based on the user interest score.

21 Claims, 11 Drawing Sheets

(51) Int. Cl.
    *G06Q 20/12*     (2012.01)
    *G06Q 30/02*     (2012.01)
    *H04N 21/466*     (2011.01)
    *G06F 21/10*     (2013.01)
    *H04N 21/482*     (2011.01)

(56) References Cited

U.S. PATENT DOCUMENTS

| | | | |
|---|---|---|---|
| 7,165,098 B1 | 1/2007 | Boyer | |
| 7,761,892 B2 | 7/2010 | Ellis | |
| 8,046,801 B2 | 10/2011 | Ellis | |
| 9,830,632 B2* | 11/2017 | Lenahan | G06Q 30/0629 |
| 10,878,248 B2* | 12/2020 | Raspotnik, Jr. | G06F 21/64 |
| 2002/0174430 A1 | 11/2002 | Ellis | |
| 2005/0251827 A1 | 11/2005 | Ellis | |
| 2007/0060173 A1* | 3/2007 | Ramer | G06Q 30/02 455/456.3 |
| 2007/0220552 A1* | 9/2007 | Juster | H04N 21/47202 725/46 |
| 2010/0153885 A1 | 6/2010 | Yates | |
| 2017/0091847 A1* | 3/2017 | Cama | G06Q 30/0629 |
| 2017/0134161 A1* | 5/2017 | Goeringer | G06Q 20/065 |
| 2018/0025005 A1* | 1/2018 | Cao | G06F 16/48 707/734 |
| 2018/0041571 A1* | 2/2018 | Rogers | G06Q 20/3827 |

OTHER PUBLICATIONS

S. Byun, S. Lee, S. Lee, K. Kim and K. Cho, "A recommendation system based on object of the interest," 2016 18th International Conference on Advanced Communication Technology (ICACT), 2016, pp. 689-691, doi: 10.1109/ICACT.2016.7423522. (Year: 2016).*

S. Liu, Y. Dong and J. Chai, "Research on personalized recommendation system of media tags based on system dynamics," 2017 10th International Congress on Image and Signal Processing, BioMedical Engineering and Informatics (CISP-BMEI), 2017, pp. 1-5, doi: 10.1109/CISP-BMEI.2017.8302153. (Year: 2017).*

S. Renaud-Deputter, T. Xiong and S. Wang, "Combining Collaborative Filtering and Clustering for Implicit Recommender System," 2013 IEEE 27th International Conference on Advanced Information Networking and Applications (AINA), 2013, pp. 748-755, doi: 10.1109/AINA.2013.65. (Year: 2013).*

\* cited by examiner

METHODS AND SYSTEMS FOR PROVIDING MEDIA ASSET RECOMMENDATIONS BASED ON DISTRIBUTED BLOCKCHAIN ANALYSIS

BACKGROUND

Modern media delivery systems are increasingly moving away from providing a physical copy of a media asset to the user. Instead, the users merely purchase an authorization to view a particular media asset. The user with such an authorization can view (e.g. stream, view, listen, read) that asset at any time, or at a time defined by the authorization. Currently, the market to trade such authorizations is very limited, and often the users do not have an option to easily buy or sell their authorizations. Furthermore, the techniques for tracking ownership of such authorizations are currently limited to a single central authority tracking which user has which authorizations. Consequently, the user's ability to transfer the authorizations is severely lacking, as the user cannot sell their authorizations, or even lend them to a friend. Furthermore, the centralized nature of tracking ownership of such authorizations is inefficient and insecure. For example, a second user (who does not have access to the central authority) is currently unable to verify if the first user really does have an ownership in a particular authorization to access a media asset. Even further, if the central authority is compromised, the record of true ownership can be tampered with or even lost entirely. Yet further, the lack of data about the chain of sales and purchases hinders the ability of media delivery systems to provide accurate media recommendations to the user. For example, a user who has sold his entire collection of horror movies may continue to receive horror movie recommendations when it is clear that the user is no longer interested in the genre.

SUMMARY

Accordingly, to overcome these problems, a distributed ledger (e.g., a blockchain ledger) may be kept for tracking ownership and transactions for authorizations to access media assets. Such distributed ledger may track the full chain of ownership of an authorization to access a certain media asset. For example, the distributed ledger may include a chain of blocks. An exemplary block may identify a certain media asset, the user who is selling an authorization to access that media asset, and the user who is buying the authorization to access that media asset. In some embodiments, the block may include a hash of a previous block and its own hash. In some embodiments, the blocks may be chained together using any other technique.

In some embodiments, whenever a user sells or buys an authorization to access a certain media asset, a new entry (describing the details of that transaction) is added to the blockchain ledger. The details of that transaction may be viewable by user via accessing the blockchain ledger. The existence of such a ledger solves the problems of users being unable to sell their authorizations and being unable to reliably track the ownership of such authorizations. Since all transactions are recorded, the ownership of a particular authorization may be readily verified by any device with access to the distributed ledger.

The distributed ledger (or any portion thereof) may be stored on one device or on multiple devices. Since all blocks entries in the ledger are linked via a chain of hashes, a single malicious user would be unable to fake a block (e.g., by creating a fake transaction transferring the authorization to access a certain media asset from some user to himself). In such cases, other users would be immediately able to recognize the fake block due to a hashing mismatch. Accordingly, the existence of such a ledger solves the security problem of storing ownership information in a single location. Since the ledger is distributed, a malicious party would have to compromise at least 51% of copies of the ledger, which is a next-to-impossible task.

Furthermore, the existence of such a ledger solves the problem of providing appropriate recommendations to the users. In some embodiments, the media guidance application may analyze the ledger to find out what kind of media assets authorizations are owned by the user, what kind of media assets authorizations were purchased by the user in the past, and what kind of media assets authorizations to were sold by the user. Importantly, the media guidance application may determine that a user who sold an authorization to access a certain media asset has a decreased interest in that kind of media asset. Accordingly, the media guidance application may no longer provide media asset recommendations to the user that the user is no longer interested in.

In some embodiments, the media guidance application may access a distributed ledger. For example, a media guidance application may access a local copy of the ledger or request a copy of the ledger from any other device (e.g., any user device, any server, any other device, or any combination thereof). The distributed ledger may include a chain of blocks (e.g., a data structure identifying several types of data). In some embodiments, each block may identify a different media asset. For example, a certain block may identify the movie "The Matrix," while another block may identify a "Game of Thrones" episode. In some embodiments, each block may also identify a user or a plurality of users who are authorized to access that media asset. For example, the block may identify that the right to access the movie "The Matrix" was transferred from user A to user B, and thus user B has authorization to access the media asset identified by that block.

In some embodiments, the media guidance application may determine, from a first block of the blocks in the distributed ledger, a media transaction that transfers authorization to access a first media asset from a first user to a second user. For example, the first block may identify that the right to access (e.g., view or stream) the movie "The Matrix" was transferred from user A to user B.

In some embodiments, the media guidance application may retrieve attributes associated with the first media asset from a media guidance database. For example, the media guidance application may determine the title, the genre, actors, or any other attribute of the first media asset. For example, the media guidance application may determine that the title is "The Matrix," the genre is "sci-fi," and the lead actor is "Keanu Reeves."

In some embodiments, the media guidance application may then identify an attribute in a profile for the first user that matches a given one of the attributes. For example, the profile for the first user may include a list of genres and associated interest levels. For example, the media guidance application may track the first user's interest level in the "sci-fi" genre. In some embodiments, the interest level may be tracked on a 1-100 scale (or any other scale).

In some embodiments, the media guidance application may then, in response to determining the media transaction, modify the profile by decreasing an interest level for the identified attribute in the profile for the first user. For example, since the user has sold his authorization to access the movie "The Matrix," the media guidance application may decrease the user's interest level in the sci-fi genre. For example, the interest level may be lowered from 82 to 72.

In some embodiments, the media guidance application may then recommend a second media asset represented by a second block of the distributed ledger to the first user based on the modified profile. For example, the media guidance application may determine that because the user's level in the sci-fi genre remains high (e.g., above a threshold of 30 points), the media guidance application may recommend to a user another sci-fi movie, e.g., the movie "Alien" (which is also tracked by the distributed ledger). In another example, the media guidance application may determine that because the user's level in the sci-fi genre is below a threshold (e.g., a score of 30), the media guidance application may recommend to a user a movie of a different genre (e.g., "comedy"). For example, the media guidance application may provide a recommendation to see or purchase an authorization to access the movie "Sleepless in Seattle" (which is also tracked by the distributed ledger).

In some embodiments, the media guidance application may store a user interest score that represents interest of the user in media assets associated with a first keyword. For example, the media guidance application may store a user profile with interest scores for multiple keywords, such as titles ("The Matrix"), genres ("sci-fi"), actors ("Keanu Reeves"), etc. In some embodiments, the score may be one of a number 1-100, or a number on any other scale. For example, the media guidance application may store a user interest score that represents the interest of the user in media assets associated with a first keyword, "sci-fi." For example, that user interest score may be a value of 62.

In some embodiments, the media guidance application may access a blockchain ledger that comprises a plurality of blocks. In some embodiments, the blockchain ledger may be a distributed ledger, that is, it may be stored by more than one device belonging to more than user. In some embodiments, the media guidance application may retrieve the ledger from the local memory, from the memories of other devices, or any combination thereof. In some embodiments, the media guidance application may retrieve parts of the ledger from different sources.

In some embodiments, the blockchain ledger may comprise a plurality of blocks. Each block may be a data structure with multiple identifiers or a database entry with multiple fields. In some embodiments, each block may identify a media asset, a seller user of an authorization to access that media asset, and a buyer user of the authorization to access that media asset. For example, the block may identify the movie "The Matrix." In some embodiments, that block may further identify user A as a seller user of an authorization to access "The Matrix" media asset. In some embodiments, that block may further identify user B as a buyer user of an authorization to access the media asset "The Matrix". In some embodiments, the existence of such a block would indicate that user A has sold the authorization to access the movie "The Matrix" to user B.

In some embodiments, the media guidance application may search the blockchain ledger to identify a first block that meets several requirements. In some embodiments, the media guidance application may search for a block that identifies a first media asset that comprises metadata that includes the first keyword, and identifies the user as the seller user of an authorization to access the first media asset. For example, the media guidance application may search for a block that identifies the movie "Alien" (which has a metadata tag "sci-fi") and identifies the user as the seller of an authorization to access the movie "Alien." In some embodiments, existence of such a block would indicate that the user has sold the authorization to access the movie "Alien."

In some embodiments, the media guidance application may, in response to identifying the first block and determining that the first block identifies the user as the seller user of the authorization to access the first media asset, decrease the user interest score. For example, in response to determining that the user has sold the authorization to access the movie "Alien," the media guidance application may reduce the user interest score related to the first keyword "sci-fi."

In some embodiments, the media guidance application may set the user interest score (e.g., user interest score related to the first keyword "sci-fi") by analyzing the blockchain ledger. For example, the media guidance application may set the score before analyzing the blockchain ledger for sales.

In some embodiments, the media guidance application may set the user interest score by searching the blockchain ledger to identify a set of purchase blocks. For example, the media guidance application may find each block that identifies a media asset that comprises metadata that includes the first keyword (e.g., "sci-fi") and identifies the user as a buyer user of an authorization to access that asset. In some embodiments, the media guidance application may then add such a found block to the set of purchase blocks. For example, the set of purchase blocks may include all blocks that identify media assets related to the keyword sci-fi and listing the user as the seller.

In some embodiments, the media guidance application may then identify the size of the set of purchase blocks. For example, the media guidance application may determine that the user has been a buyer in media asset transactions related to the keyword "sci-fi" seven times.

In some embodiments, the media guidance application may, in response to identifying the set of purchase blocks, set the user interest score based on the size of the set of purchase blocks. For example, the media guidance application may set the interest score higher the larger the size of the set of purchase blocks is. For example, if the size is larger than 7, the media guidance application may set the interest score at a value of 100. If the size is larger than 2 but smaller than 7, the media guidance application may set the interest score at a value of 50. If the size is smaller than 2, the media guidance application may set the interest score at a value of 10. In some embodiments, the interest score may be set based on the size in any other way.

In some embodiments, the media guidance application may determine whether the user interest score corresponds to a threshold. For example, the media guidance application may use the threshold of 60. In this example, the user interest score may be compared to the value of 60. In some embodiments, the media guidance application may, in response to determining that the user interest score corresponds to the threshold, provide the media asset recommendation to the user. For example, the media asset recommendation may recommend a second media asset related to the first keyword. For example, if the user's interest score related to the keyword "sci-fi" exceeds the threshold, the media guidance application may recommend another media asset that has metadata that includes the word "sci-fi" (e.g., the movie "Serenity.")

In some embodiments, the first block may identify a price value indicative of the amount of money paid to or by the user. In some embodiments, the price value be stored in a storage distinct from the blockchain. For example, the first block may include a link (e.g., a hyperlink) identifying a storage location (e.g., a network location) where the price value is stored. In some embodiments, the first block may identify a price value associated with the sale of the authorization to access the movie "The Matrix" as "$2." In some embodiments, the media guidance application may in response to determining that the price value does not exceed the threshold (e.g., "$5"), modify the user interest score by a first amount. In some embodiments, the low selling price may indicate that the user is rapidly losing interest and seeks to make a quick sale. In some embodiments, in such cases, the media guidance application may lower the user interest score by a relatively high value of 20. In some embodiments, the media guidance application may, in response to determining that the price value exceeds the threshold, modify the user interest score by a second amount. For example, the media guidance application may lower the user interest score by a relatively low value of 5.

In some embodiments, the first block may identify a time value, wherein the authorization to access the first media asset reverts to the seller user after the amount of time indicated by the time value elapses. For example, sometimes the sale may not be final; instead the seller user may lend the authorization to access the first media asset to the buyer user for a period of time defined by the time value (e.g. for 48 hours.) In some embodiments, the media guidance application may determine whether the time value exceeds a threshold (e.g., 2 weeks). In some embodiments, the media guidance application may, in response to determining that the time value does not exceed the threshold, modify the user interest score by a first amount. In some embodiments, this may indicate that the use does not really have much interest, since she is willing to allow a long-term lease. For example, in such cases, the media guidance application may lower the user interest score by a low amount (e.g., by a value of 5.) In some embodiments, the media guidance application may, in response to determining that the price value exceeds the threshold, modify the user interest score by a second amount. For example, in such cases, the media guidance application may lower the user interest score by a high amount (e.g., by a value of 20.)

In some embodiments, the media guidance application may search the blockchain ledger to identify a second block. In some embodiments, the second block may identify a second media asset that comprises metadata which includes a second keyword related to the first keyword. For example, the media guidance application may search for a block that identifies a media asset that has metadata tag "horror" (which is related to the tag "sci-fi"). In some embodiments, the second block may also identify the user as one of a seller user or a buyer user of an authorization to access the second media asset. For example, the second block may identify the user as the seller of an authorization to access the movie "Pitch Black. In some embodiments, the media guidance application may, in response to identifying the second block, modify the user interest score based on whether the second block identifies the user as the seller user of the authorization to access the second media asset or as the buyer user of the authorization to access the second media asset. For example, if the user sold the authorization to access the movie "Pitch Black," the media guidance application may decrease the user interest score because if the user is losing interest in the horror genre, the user also likely losing interest in the sci-fi genre. In another example, if the user bought the authorization to access the movie "Pitch Black," the media guidance application may increase the user interest score, because if the user is gaining interest in the horror genre, the user also likely gaining interest in the sci-fi genre.

In some embodiments, the first block may identify a timestamp indicative of a time when the authorization to access the first media asset was transferred to the user. For example, the timestamp may indicate the date of Mar. 1, 2018. In some embodiments, the media guidance application may determine a time indicative of when the user watched the first media asset. For example, the media guidance application may determine that the user has watched the movie "The Matrix" on Mar. 2, 2018. In some embodiments, the media guidance application may determine a time value of the difference between the time identified by the timestamp and the time indicative of when the user watched the first media asset. In an example, the difference time value may be 1 day. In another example, the difference time value may be 20 days. In some embodiments, the media guidance application may, in response to determining that the difference time value does not exceed the threshold (e.g., 5 days), modify the user interest score by a first amount (e.g., by increasing the interest score by 20). For example, the media guidance application may determine that, if the user has watched the media asset quickly after purchase, he has a high interest level. In some embodiments, the media guidance application may, in response to determining that the price value exceeds the threshold, modify the user interest score by a second amount (e.g., by decreasing the interest score by 5). For example, the media guidance application may determine that if user has watched the media asset long after the purchase, he has low interest level.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
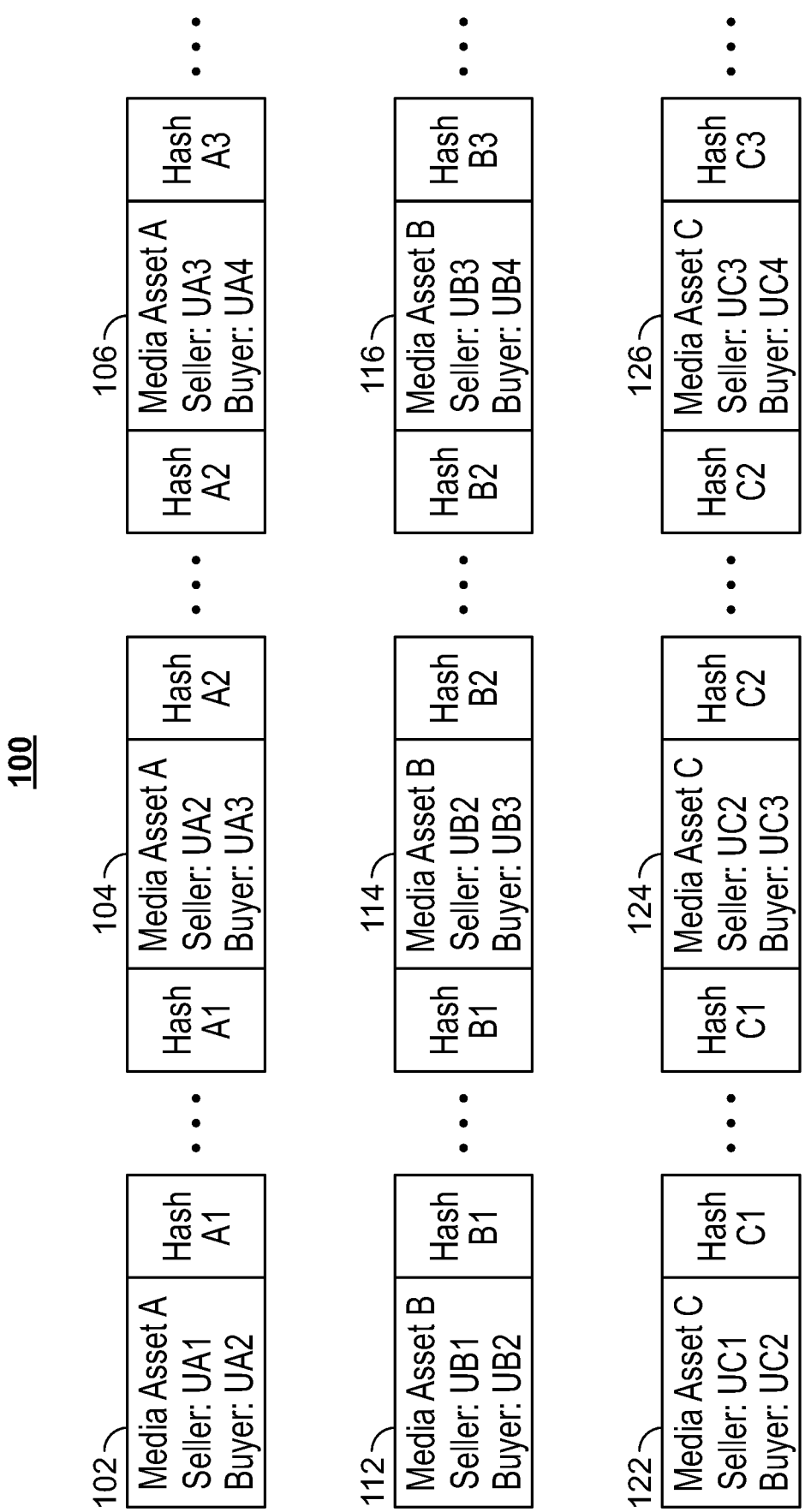
FIG. 1A shows an illustrative block diagram of an exemplary blockchain, in accordance with some embodiments of the disclosure.

In some embodiments, the media guidance application may use a distributed blockchain ledger to provide media recommendations to the user. For example, the media guidance application may search the blockchain ledger to identify transactions where a user sells authorization to access some type of media assets (e.g., media assets related to a certain keyword, e.g., "sci-fi"). In some embodiments, the media guidance application may determine that such sales indicate that the user is losing interest in such assets. Accordingly, the media guidance application may lower the interest score related to that keyword in the profile of the user. The interest score may then be used to decide where a recommendation should be provided. For example, assets related to that keyword may be provided only if the interest score is sufficiently high. These techniques significantly improve the operation of a media delivery system by allowing for accurate recommendations that account for the user losing interest in certain topics (e.g., by avoiding recommending a type of media asset that the user has lost interest in).

As referred to herein, the term "distributed ledger" refers to any kind of data record, data structure, or database that includes records of any kind of sale, purchase, lease, loan, option, any other financial transaction, or any combination thereof that is stored in a distributed manner. For example, a distributed ledger may be stored on several devices (e.g., user devices, server devices, cloud devices, or any combination thereof) at the same time. In some embodiments, each device may store the entirety of the distributed ledger. In some embodiments, each device may store a portion of the distributed ledger.

As referred to herein, the term "blockchain ledger" refers to any kind of data record, data structure, or database that comprises a plurality of blocks that are linked to one another in a way that increases the security of the entire blockchain ledger. For example, each block of the blockchain ledger may include a hash calculated based on all other data of that block. In this example, each block of the blockchain ledger (that is not an initial block) may also include a hash of a previous block in the blockchain ledger. In some embodiments, the blockchain ledger may also be a distributed ledger.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. In some embodiments, the interactive media guidance application may include an off-chain oracle. In some embodiments, the off-chain oracle may be used by any device accessing the blockchain to access data related to the blockchain but stored separately from the blockchain.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative block diagram of exemplary blockchain 100, in accordance with various embodiments of the disclosure. In some embodiments, blockchain 100 may track purchase transactions for authorizations to view multiple media assets (e.g., media assets A, B, and C). In some embodiments, blockchain 100 may include separate chains of ownership for each asset A, B, and C. Each chain may comprise a set of blocks. Each block may include an identification of the media asset, an identification of a seller, and an identification of a buyer. In some embodiments, each block may also include its own hash. The hash may be calculated by applying a hash function to all other data of the block. In some embodiments, all blocks (except the initial block in the chain) may include the hash of the previous block in the chain.

In some embodiments, blockchain 100 may be a distributed ledger. For example, copies of blockchain 100 (or portions of blockchain 100) may be stored by multiple devices. Due to the hash chaining, no single malicious user can fake the content of any block without compromising every single copy of the blockchain. That is, if a malicious user tried to insert a fake block describing a fraudulent transaction, other users would be able to determine a hash mismatch and reject the fake block.

In some embodiments, blockchain 100 may include a first set of blocks for tracking the ownership of authorization to view asset A (e.g., the movie "The Matrix"). For example, the first block in the first set (block 102) may identify asset A (e.g., the movie "The Matrix"), seller user UA1, and buyer user UA2. In some embodiments, user UA1 may be the originator of the content. In some embodiments, the block 102 may include hash A1 that is calculated by hashing all other information in block 102. The presence of block 102 in blockchain 100 may indicate that the authorization to access (e.g., view) asset A was transferred from user UA1 to user UA2.

In some embodiments, the first set may include second block 104. For example, block 104 may identify asset A (e.g., the movie "The Matrix"), seller user UA2 (the same user who was the buyer in block 102), and buyer user UA3. The presence of block 104 in blockchain 100 may indicate that the authorization to access (e.g., view) asset A was transferred from user UA2 to user UA3. In some embodiments, block 104 may include hash A1 (of block 102). In some embodiments, block 104 may include its own hash A2 computed by applying a hash function based on all other data in block 104. In some embodiments, block 106 may similarly indicate a transfer of authorization to access asset A from user UA3 to user UA4.

In some embodiments, blockchain 100 may include a second set of blocks tracking the ownership of authorizations to view asset B (e.g., a "Game of Thrones" episode). Blocks 112, 114, 116 may together indicate a chain of transfers of the authorization to access asset B from user UB1 to user UB2, to user UB3, to user UB4.

In some embodiments, blockchain 100 may include a third set of blocks tracking the ownership of authorizations to view asset C (e.g., the digital book "The Hobbit"). Blocks 122, 124, 126 may together indicate a chain of transfers of the authorization to access asset B from user UC1 to user UC2, to user UC3, to user UC4.

In some embodiments, each block may have indicated a variety of other data. For example, some blocks may include price data, time of the transaction data, data indicating the length of the transfer of a media asset (e.g., a seller may have sold the authorization to access asset A for a predefined time period only).

Figure 1B:
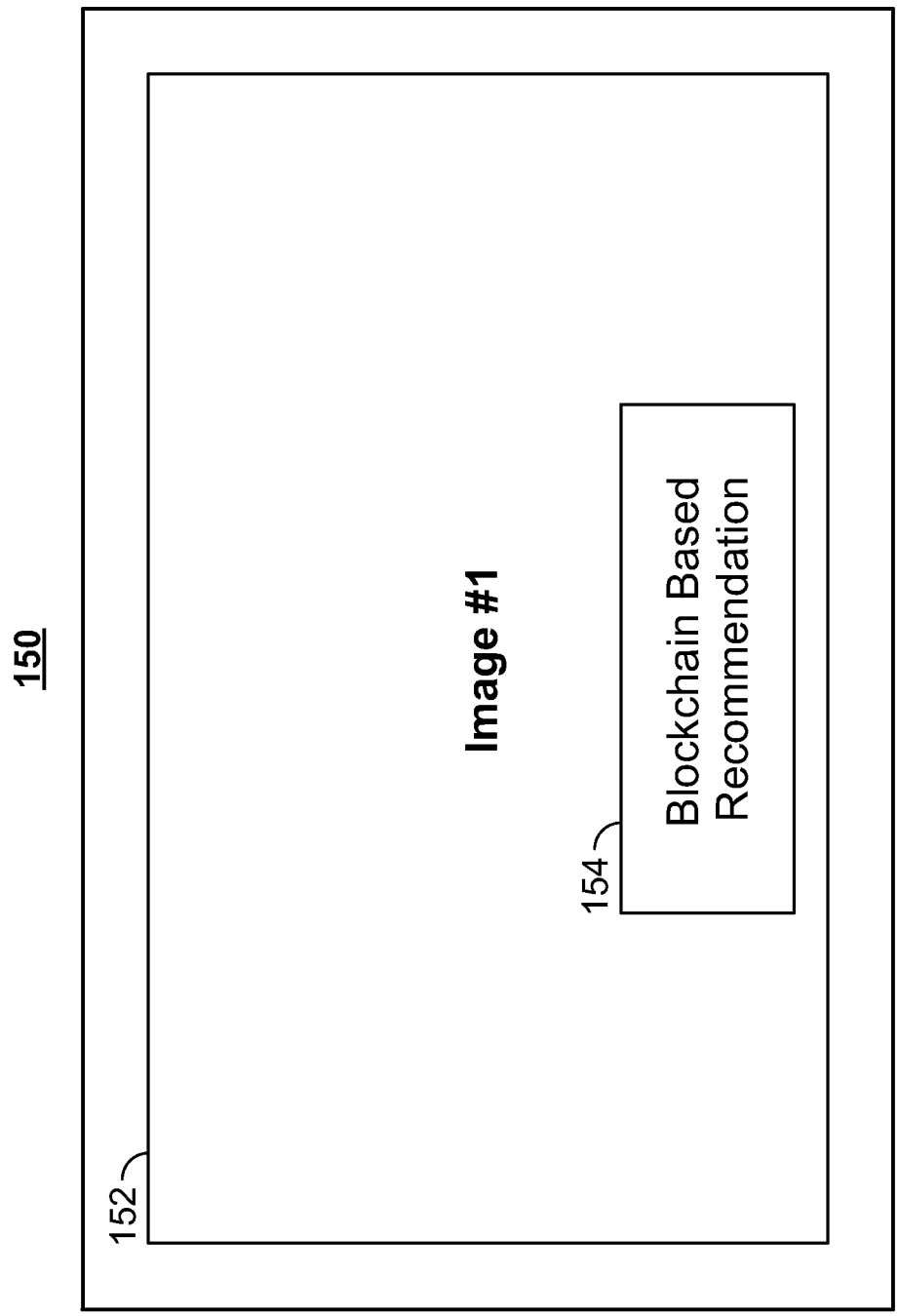
FIG. 1B shows an illustrative media guidance interface that may dynamically include or exclude a video, in accordance with some embodiments of the disclosure.

FIG. 1B shows an illustrative media guidance interface that may dynamically include or exclude a video, in accordance with various embodiments of the disclosure. In some embodiments, display 150 may display a media asset provided by the media guidance application. For example, display 100 may display image 152. Image 152 may be a part of the media asset provided by the media guidance application.

In some embodiments, the media guidance application may provide a recommendation to the user based on analysis of a distributed ledger (e.g., blockchain ledger 100). In some embodiments, the media guidance application may display blockchain-based recommendation 154 as overlaid over image 152. In some embodiments, blockchain-based recommendation 154 may be based on the techniques described above and below.

For example, the media guidance application may have determined that the user has high interest in media assets related to a first keyword (e.g., "sci-fi") by analyzing blockchain 100 (e.g., the user may have purchased a large number of access authorizations to media assets related to the keyword sci-fi). In this example, blockchain-based recommendation 154 may include a recommendation for a media asset that has a metadata tag "sci-fi" (e.g., the movie "Alien"). In this example, blockchain-based recommendation 154 may include the text "You have been purchasing sci-fi content lately, please also consider the movie 'Alien.'"

In some embodiments, the media guidance application may have determined that the user is losing interest in media assets related to a first keyword (e.g., "sci-fi") by analyzing blockchain 100 (e.g., the user may have sold a large number of access authorizations to media assets related to the keyword "sci-fi"). In this example, blockchain-based recommendation 154 may include a recommendation for a media asset that has no metadata tag "sci-fi" (e.g., the movie "Sleepless in Seattle"). In this example, blockchain-based recommendation 154 may include the text "You have been selling sci-fi content lately, perhaps you should try watching romantic comedies instead? Please consider the movie 'Sleepless in Seattle.'"

In some embodiments, each block 102-126 may also include one or more decryption keys. For example, blocks 102, 104, 106 may include an encryption key that is needed to access media asset A. For example, asset A may be available in encrypted form (e.g., from a streaming server), but only users with access to the key may be able to decrypt it. In some embodiments, the encrypted key may be accessible only to the user identified as the buyer in the last block in the chain 102-106. For example, only user UA4 may be able to access the decryption key from block 106.

In some embodiments, when a user sells the authorization to access a media asset, a new block is added to blockchain 100. For example, if user UA4 were to sell the authorization to access media asset A, a new block may be added after block 106 identifying the details of that transaction.

In some embodiments, each block may include a time value that limits the access to the identified media asset. For example, block 106 may specify that user UA4 only has 2 days of access to media asset A.

In some embodiments, blockchain 100 may be used to track the viewing behavior of a user or a plurality of users. For example, each block where the user is identified as buyer may also store timestamps indicative of when that user actually accessed (e.g., viewed, listed to, or read) the media asset identified by that block. For example, block 106 may specify that user UA4 accessed media asset A on Feb. 1, 2018 and on Feb. 15, 2018.

In some embodiments, blockchain 100 may be displayed on display 150 in a grid format. For example, blockchain 100 may be displayed as shown on FIG. 1A, where the vertical axis is used to represent different media assets, and the horizontal axis is used to represent time. For example, a user viewing blockchain 100 on display 150 may scroll up and down to see chains for different assets, and scroll left and right to track blocks arranged in chronological order. In some embodiments, chains for each media asset (e.g., assets A, B, and C) may be their own blockchains, which may be individually browsed.

In some embodiments, the media guidance application (e.g., by using an off-chain oracle) may offer and fulfill smart contracts to the users by using blockchain 100 and/or the data accessible by the off-chain oracle. In some embodiments, smart contract rules may determine how blockchain 100 or information stored outside of blockchain 100 (e.g., information accessed by an off-chain oracle) is modified in relation to media assets. For example, the user may have a subscription to media assets of a certain type (e.g., to all new songs by a particular artist). In some embodiments, when a new media asset (e.g., a new song by the particular artist) becomes available, a new block may be automatically added to the blockchain (e.g., blockchain 100). Such a block may identify the new media asset, and identify the user as the buyer. In some embodiments, the smart contracts may be stored outside of the blockchain and rely on an off-chain oracle to modify contract information stored outside of blockchain 100 and information stored as a part of blockchain 100.

Consequently, the user would have automatically gained an authorization to access that media asset (e.g. listen to a new song). In some embodiments, the user can view that block and perform one or more of several actions. For example, the user may transfer the authorization to access that media asset to a different device (a new block in blockchain 100 would be generated to reflect this transfer). In another example, the user may transfer the authorization to access that media asset to a different user (a new block in blockchain 100 would also be generated to reflect this transfer). In some embodiments, the user may transfer the authorization to access that media asset to a different user with one or more restrictions (e.g., for a limited time period). Such restrictions may be recorded in the new block of blockchain 100. A smart contract may have an expiration date, after which no new blocks would be automatically added to blockchain 100.

In some embodiments, blockchain 100 enables a call-out to a third party. For example, any owner of an authorization to access a media assert can sell that authorization to another user by creating an appropriate new block in blockchain 100. For example, if a user records a program on a DVR, that user may give the rights to view that program to another user, by creating an appropriate block to be added to blockchain 100. In some embodiments, such a transfer may be temporary. For example, the generated block may include an expiration date or a limit on how many times that media asset may be accessed. In some embodiments, the block may include data recording what user actually accessed that media asset. In some embodiments, the media guidance application may access blockchain 100 to track what kinds of users access that media content and when. In some embodiments, the media guidance application may base a recommendation on such analysis.

In some embodiments, the user may keep a personal record of blocks in blockchain 100 that relate to that user. For example, the user may use blockchain 100 to keep a record of all media assets ever accessed by the user. In some embodiments, the user may analyze the personal blockchain to find new media assets to consume.

In some embodiments, media assets A, B, and C may be scenes from a single media asset. In some embodiments, blockchain 100 may be used to enforce sequential playback of that single media asset. For example, each block in blockchain 100 may include a different private key needed to watch the next scene. In some embodiments, a user does not obtain the decryption key from the next block in the blockchain for the next scene until the current scene is completely watched. For example, in order to obtain access to a scene, a user will need to provide a decryption key for each past scene, and such keys may be obtained only by completely watching media assets identified by those blocks. For example, Media asset C (identified by block 126) may not be accessed until user UA4 has watched media assets A and B and can provide private keys stored in blocks 106 and 116. In some embodiments, the media guidance application can also generate recommendations for different chains of scenes related to the media assets that the user just viewed. For example, the media guidance application may recommend a media asset that was commonly viewed by other users after they finished watching media assets A, B, and C.

In some embodiments, blockchain 100 may include blocks with geographical limitation. For example, block 106 may define a geographical area from which media asset A may be accessed. For example, user UA4 may be able to access media asset A only from a device that is located in the defined geographical area. For example, media asset A may be a NY Giants football game, which can only be accessed by users from New York. The device of user UA4 will have to provide a valid GPS-derived location in the New York area to access media asset A (e.g., the NY Giants football game).

Figure 2:
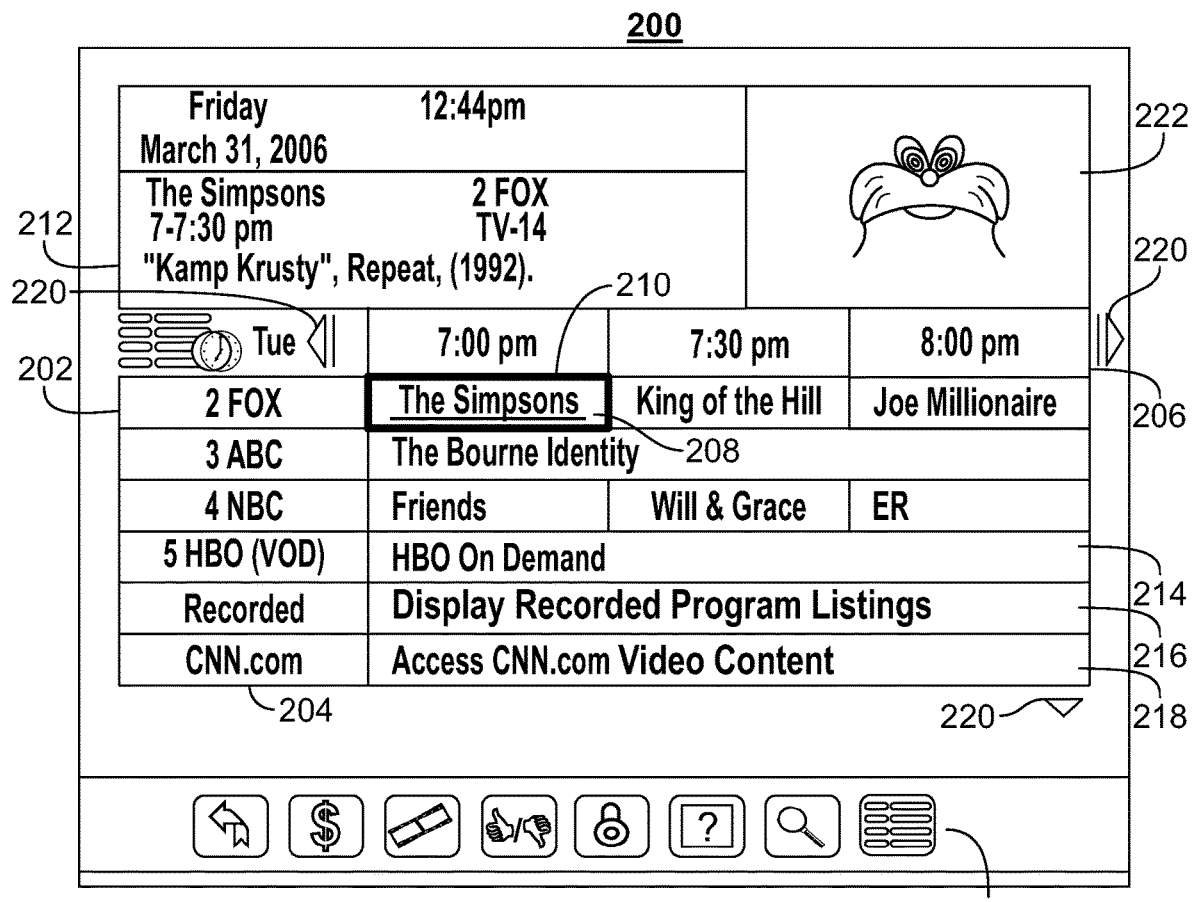
FIG. 2 shows another illustrative media guidance interface that may dynamically include or exclude a video, in accordance with some embodiments of the disclosure.
Figure 3:
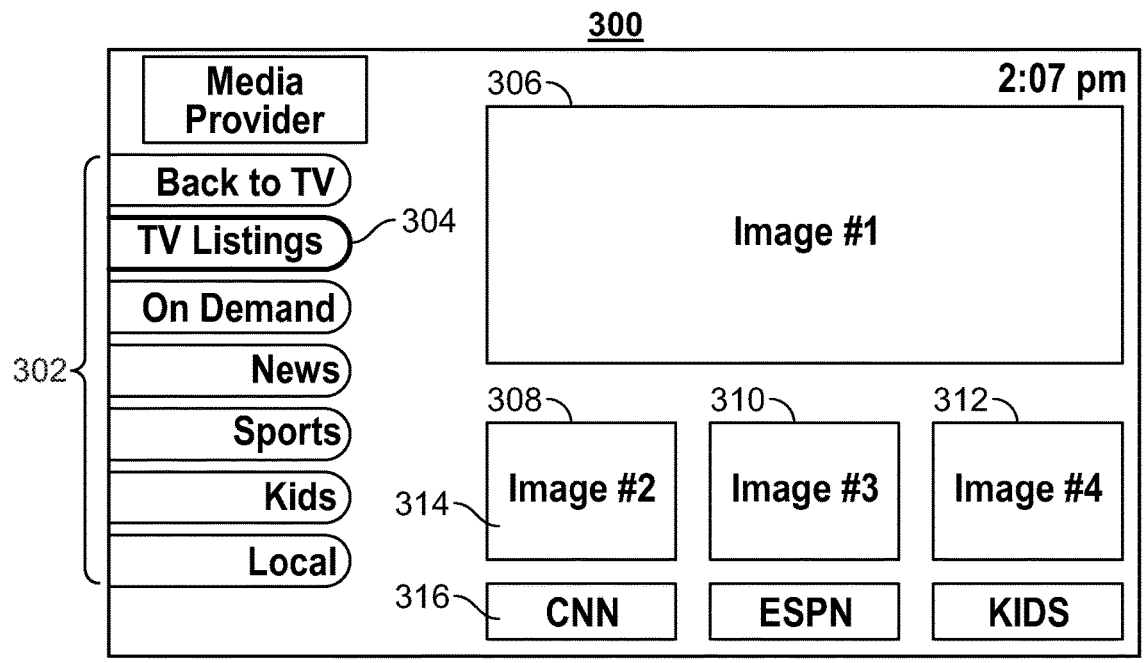
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
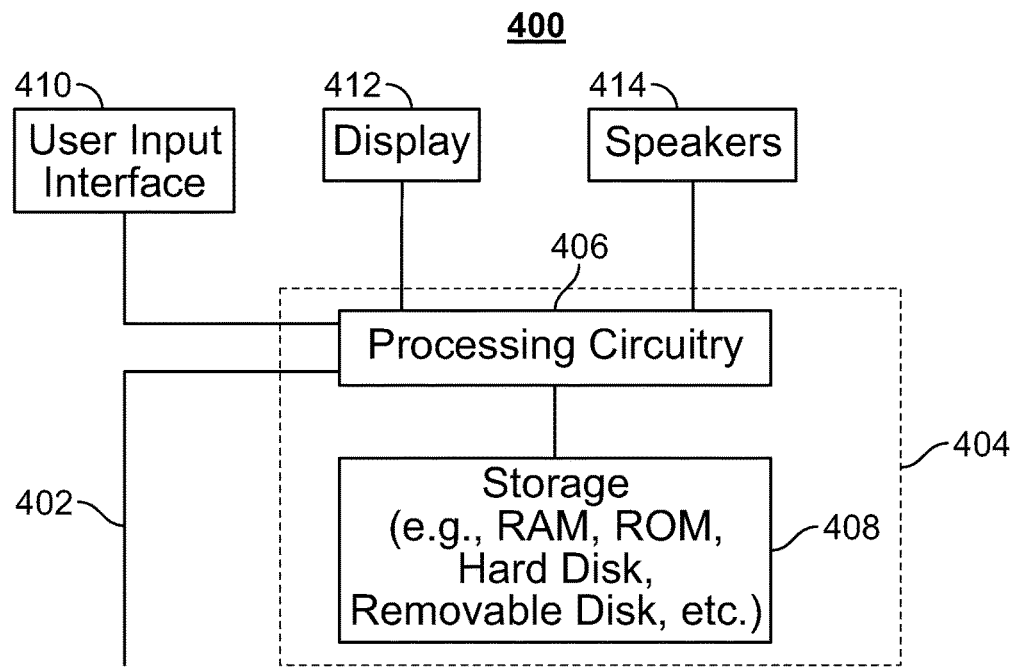
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D.

A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
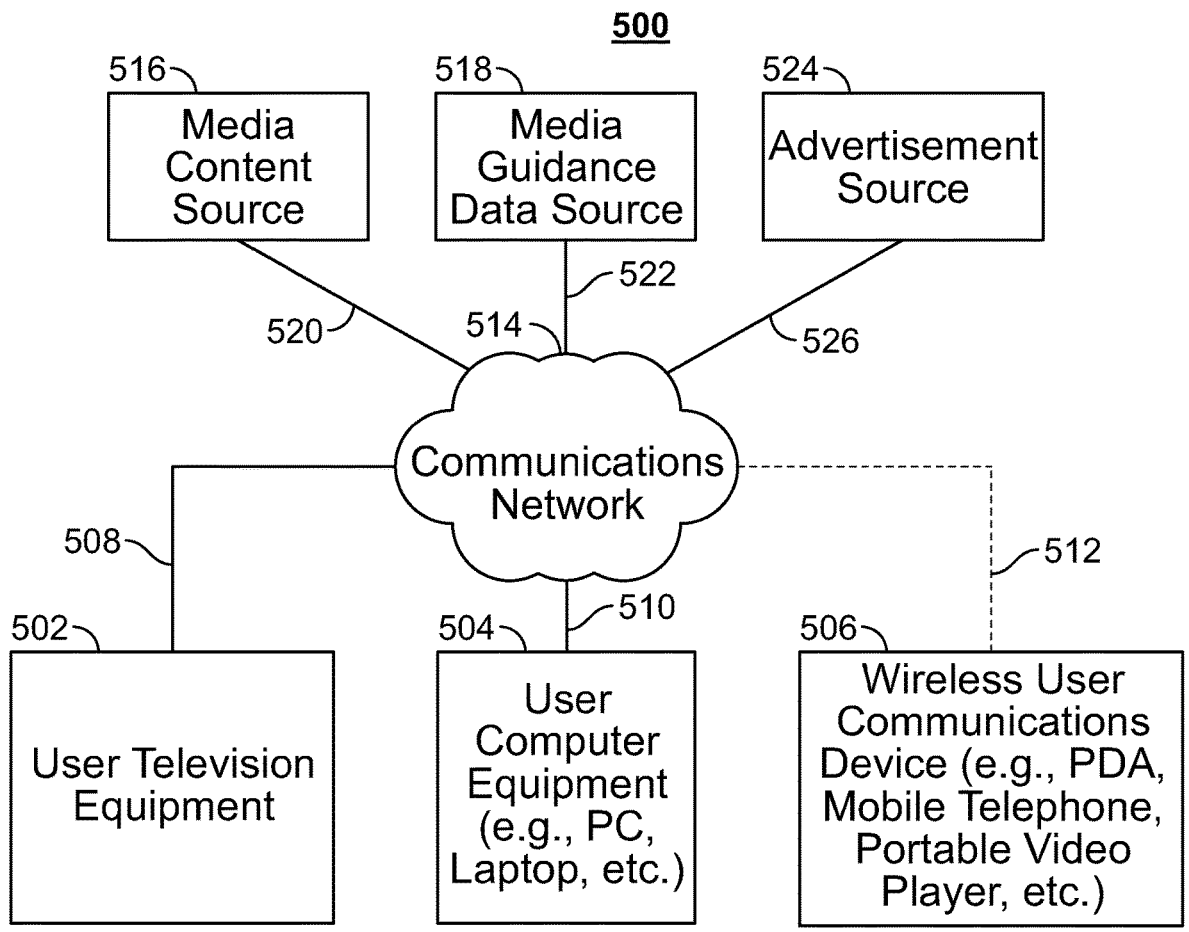
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-12 are provided below. It should be noted that processes 600-1200, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
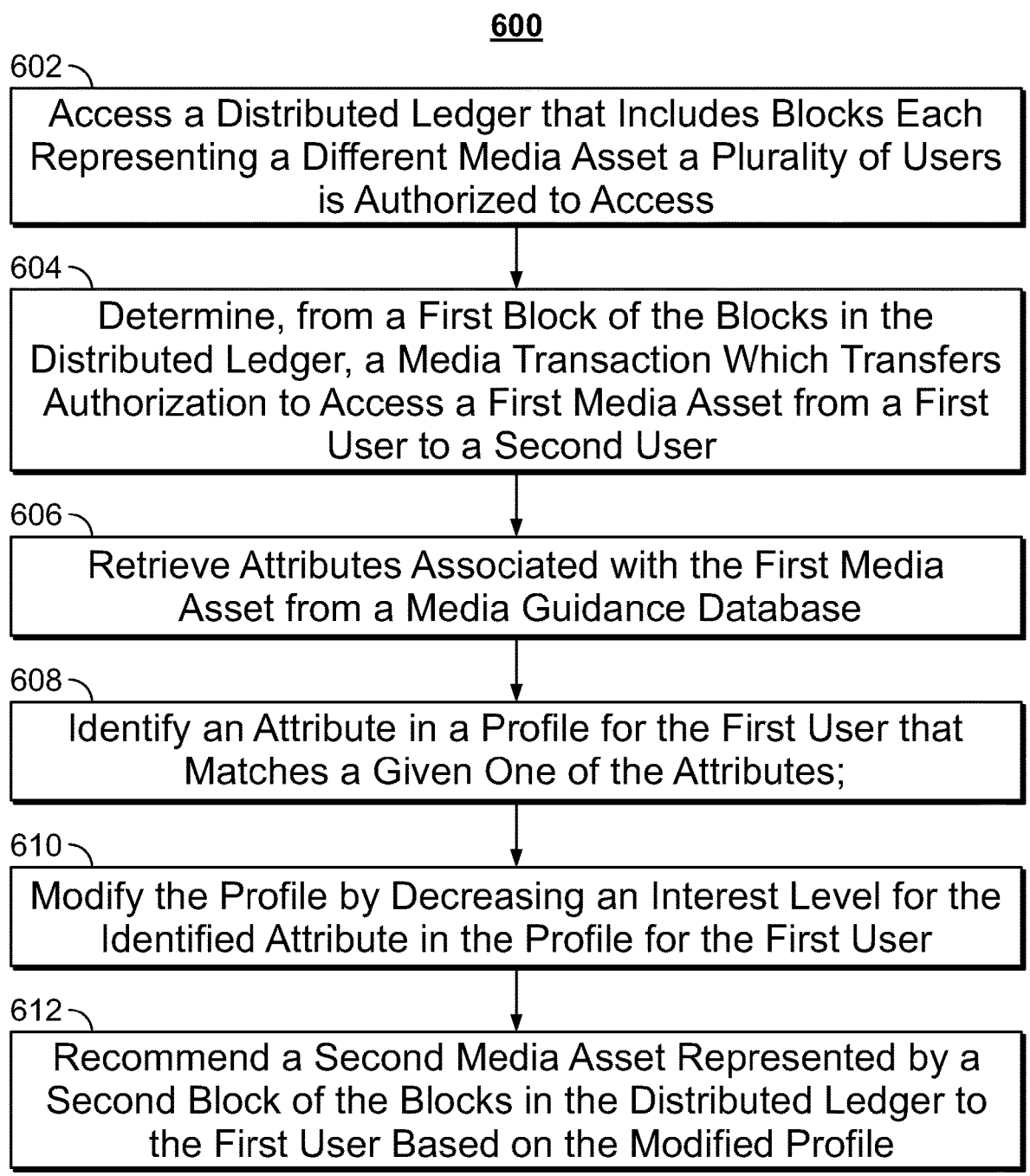
FIG. 6 depicts an illustrative flow diagram for a process of recommending a media asset, in accordance with some embodiments of the disclosure.

FIG. 6 depicts an illustrative flow diagram of a process 600 for a process of recommending a media asset in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 may access a distributed ledger (e.g., blockchain ledger 100 of FIG. 1A) that includes blocks each representing a different media asset (e.g., assets A, B, C of FIG. 1A) a plurality of users (e.g. users UA4, UB4, etc., of FIG. 1A) are authorized to access. In some embodiments, control circuitry 404 may access the distributed ledger from local memory (e.g., storage 408). In some embodiments, control circuitry 404 may access the distributed ledger from another device or devices (e.g., user computer equipment 504, media content source 516, or media guidance data source 518). In some embodiments, control circuitry 404 may access parts of the distributed ledger from other devices. For example, one part of the distributed ledger may be received from a user device, and another part from a second user device of another user.

Process 600 continues at 604, where control circuitry 404 may determine, from a first block of the blocks in the distributed ledger, a media transaction which transfers authorization to access a first media asset from a first user to a second user. For example, control circuitry 404 may determine that block 106 of FIG. 1A records a transfer of authorization to access asset A (e.g., the movie "The Matrix") from user UA3 to user UA4.

In some embodiments, control circuitry 404 may retrieve attributes associated with the first media asset from a media guidance database. For example, control circuitry 404 may retrieve such attributes from media guidance data source 516. In some embodiments, control circuitry 404 may receive metadata tags associated with the first media asset. For example, control circuitry 404 may receive a genre tag (e.g., "sci-fi") associated with the movie "The Matrix." In some embodiments, any other tag (e.g., title, actors, year of release) may also be received by control circuitry 404.

Process 600 continues at 604, where control circuitry 404 may identify an attribute in a profile for the first user that matches a given one of the attributes. For example, control circuitry 404 may evaluate the profile of the user UA3 to determine if that user has interest levels for various attributes. For example, control circuitry 404 may identify that the profile of the user UA3 includes an interest level score for the sci-fi genre. For example, the score may be a value of 58 on a 1-100 scale.

Process 600 continues at 606, where control circuitry 404 may, in response to determining the media transaction, modify the profile by decreasing an interest level for the identified attribute in the profile for the first user. For example, since control circuitry 404 has determined that user UA3 has sold the authorization to access a first media asset (e.g., the movie "The Matrix"), control circuitry 404 may determine that user UA3's interest in the sci-fi genre has decreased. In some embodiments, control circuitry 404 may decrease the interest level (e.g., the interest score for the genre of sci-fi). For example, control circuitry 404 may decrease the score by a value of 10. In some embodiments, the interest level may be decreased by any other preset or dynamically determined amount.

Process 600 continues at 608, where control circuitry 404 may recommend a second media asset represented by a second block of the blocks in the distributed ledger to the first user based on the modified profile. For example, if the interest level of the first user (e.g., user UA3) remains high (e.g., if the interest score for genre of sci-fi is above the threshold), control circuitry 404 may provide a recommendation for a media asset that also matches a given one of the attributes. For example, control circuitry 404 may provide a recommendation for another sci-fi movie (e.g., "Alien"). For example, the recommendation may appear as blockchain-based recommendation 154. In another example, if the interest level of the first user (e.g., user UA3) becomes low (e.g., if the interest score for genre of sci-fi is at or below the threshold), control circuitry 404 may provide a recommendation for a media asset that does not match a given one of the attributes. For example, control circuitry 404 may provide a recommendation for another movie of a genre other than sci-fi (e.g., the romantic comedy "Sleepless in Seattle"). For example, the recommendation may appear as blockchain-based recommendation 154. In some embodiments, the second media asset may be represented by a second block of the distributed ledger (e.g., blockchain ledger 100). For example, the second media asset may be asset B of FIG. 1A and it may be identified by block 116.

Figure 7:
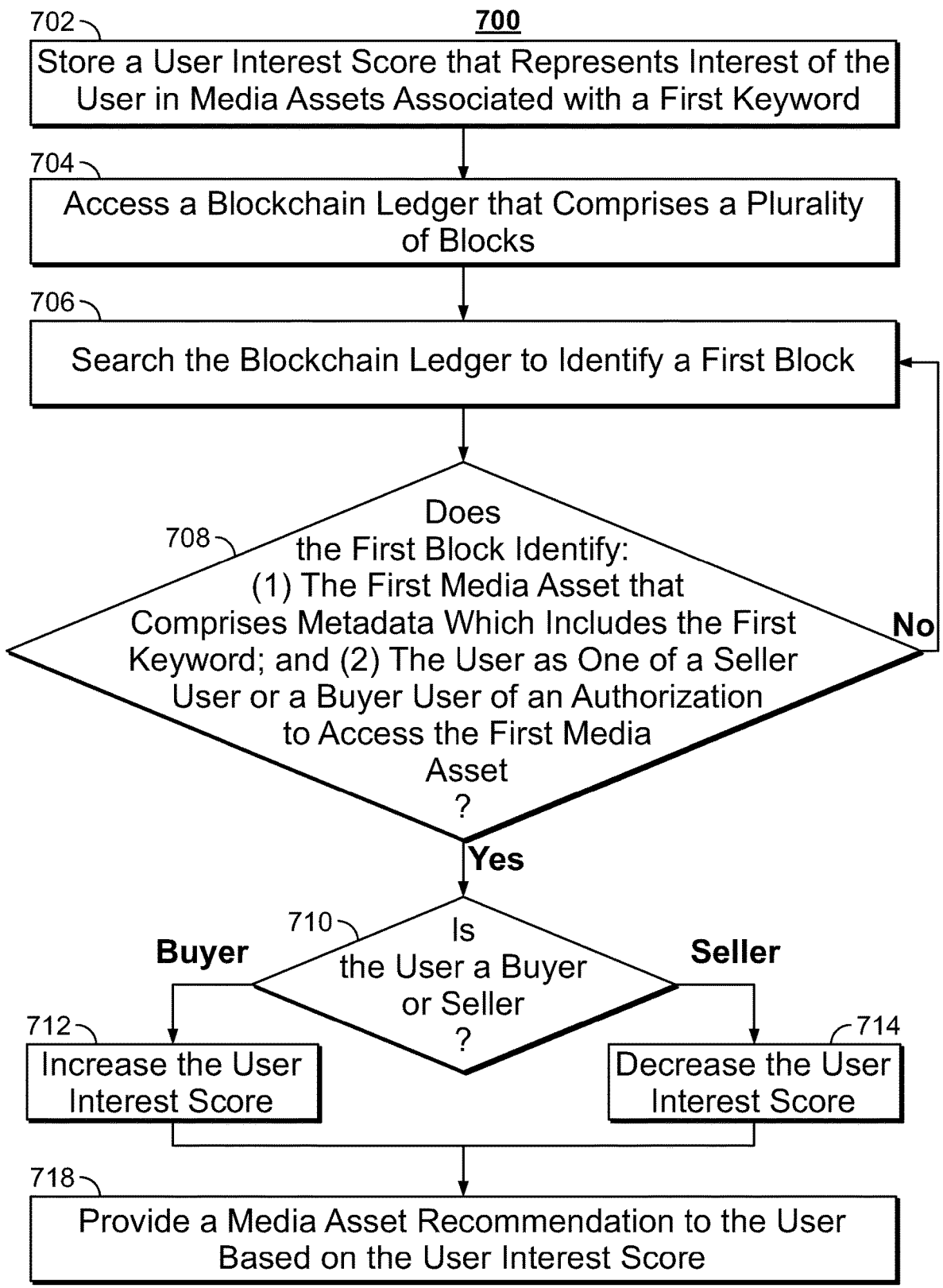
FIG. 7 depicts another illustrative flow diagram for a process of recommending a media asset, in accordance with some embodiments of the disclosure.

FIG. 7 depicts another illustrative flow diagram of a process 700 for a process of recommending a media asset in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 may store a user interest score that represents the interest of the user in media assets associated with a first keyword. For example, control circuitry 404 may store a profile of user UA3 of FIG. 1A. The profile may include a set of interest scores associated with a plurality of keywords (e.g., keywords may represent titles, genres, actor names, any other metadata tag, or any other keyword associated with any kind of a media asset). For example, the first keyword may be "sci-fi." In this example, the interest score represents the user's interest in media assets with the tag "sci-fi." In some embodiments, the user may be user UA3 or user UA4 of FIG. 1A. In some embodiments, control circuitry 404 may store the user interest score locally in storage 408. In some embodiments, control circuitry 404 may store the user interest score remotely (e.g., at media guidance data source 516).

Process 700 continues at 704, where control circuitry 404 may access a blockchain ledger (e.g., blockchain ledger 100 of FIG. 1A) that comprises a plurality of blocks (e.g., blocks 102-126). In some embodiments, control circuitry 404 may access the distributed ledger from local memory (e.g. storage 408). In some embodiments, control circuitry 404 may access the distributed ledger from other device or devices (e.g., user computer equipment 504, media content source 516, or media guidance data source 518). In some embodiments, control circuitry 404 may access parts of the distributed ledger from other devices. For example, one part of the distributed ledger may be received from a user device, and another part from second user device of another user.

In some embodiments, each block of the blockchain ledger may identify several types of data. In some embodiments, each block may identify a media asset, a seller user of an authorization to access that media asset, and a buyer user of the authorization to access that media asset. For example, block 106 may identify media asset A, a seller user of an authorization to access media asset A (e.g., user UA3), and a buyer user of an authorization to access media asset A (e.g., user UA4).

Process 700 continues at 706, where control circuitry 404 may search the blockchain ledger to identify a first block (e.g., a block that meets certain criteria). For example, control circuitry 404 may search blockchain ledger 100 for a block that identifies a first media asset that comprises metadata which includes the first keyword (e.g., the sci-fi keyword), and identifies the user (e.g., user UA3) as the seller user or the buyer user of an authorization to access the first media asset. For example, control circuitry 404 may identify block 106 of FIG. 1A, if that block identifies the movie "The Matrix" (which has metadata that includes the sci-fi keyword) and identifies user UA3 as the seller user of authorization to access the movie "The Matrix." In another example, control circuitry 404 may identify block 104 of FIG. 1A, if that block identifies the movie "The Matrix" (which has metadata that includes the sci-fi keyword) and identifies user UA3 as the buyer user of authorization to access the movie "The Matrix."

Process 700 continues at 708, where control circuitry 404 may proceed differently based on whether the first block was found at step 706. In some embodiments, if the first block identifies a first media asset that comprises metadata that includes the first keyword, and identifies the user (e.g., user UA3) as the seller user or the buyer user of an authorization to access the first media asset, control circuitry 404 may proceed to step 710. In some embodiments, if the first block is not found, control circuitry 404 may proceed back to step 706 and repeat the search. For example, step 706 may be performed on a periodic basis (e.g., every day) to capture possible changes to the blockchain ledger.

Process 700 continues at 710, where control circuitry 404 may determine if the first block identifies the first user as a seller user or as buyer user. In some embodiments, step 710 may be optional. For example, the search at step 706 may only search for blocks that identify the first user as a seller user; in this case process 700 may skip step 710 and proceed directly to step 714. In another, the search at step 706 may only search for blocks that identify the first user as a buyer user; in this case process 700 may skip step 710 and proceed directly to step 712. In some embodiments, control circuitry 404 may proceed to step 712 if the first block (e.g., block 106) identifies the user (e.g. user UA3) as the buyer user. In some embodiments, control circuitry 404 may proceed to step 714 if the first block (e.g., block 106) identifies the user (e.g. user UA3) as the seller user.

At 712, control circuitry 404 may increase the user interest score. For example, control circuitry 404 may increase the user interest score associated with the keyword "sci-fi" by a predetermined amount (e.g., 10 points). In some embodiments, the magnitude of the increase may be dynamically determined based on other data stored in the first block, any other data, or any combination thereof.

At 714, control circuitry 404 may decrease the user interest score. For example, control circuitry 404 may decrease the user interest score associated with the keyword "sci-fi" by a predetermined amount (e.g., 10 points). In some embodiments, the magnitude of the decrease may be dynamically determined based on other data stored in the first block, any other data, or any combination thereof.

Process 700 continues at 718, after either one of the steps 712 or 714. At 718, control circuitry 404 may provide a media asset recommendation to the user based on the user interest score. For example, control circuitry 404 may determine whether the user interest score corresponds to a threshold (e.g., a preset threshold of 60, any other preset threshold, or a dynamically determined threshold). In some embodiments, control circuitry 404 may, in response to determining that the user interest score corresponds to the threshold, provide a media asset recommendation to the user. In some embodiments, the media asset recommendation may be a recommendation for a second media asset that is related to the first keyword (e.g., the second media asset may have metadata identifying the first keyword). For example, if the first keyword is "sci-fi," control circuitry 404 may provide a recommendation for a different sci-fi movie (e.g., the movie "Alien").

In some embodiments, control circuitry 404 may, in response to determining that the user interest score does not correspond to the threshold, provide a different media asset recommendation to the user. In some embodiments, the media asset recommendation may be a recommendation for a second media asset that is not related to the first keyword (e.g., the second media asset may have metadata that does not identify the first keyword). For example, if the first keyword is "sci-fi," control circuitry 404 may provide a recommendation for a movie of a different genre (e.g., the movie "Sleepless in Seattle," which does not have a sci-fi metadata tag).

Figure 8:
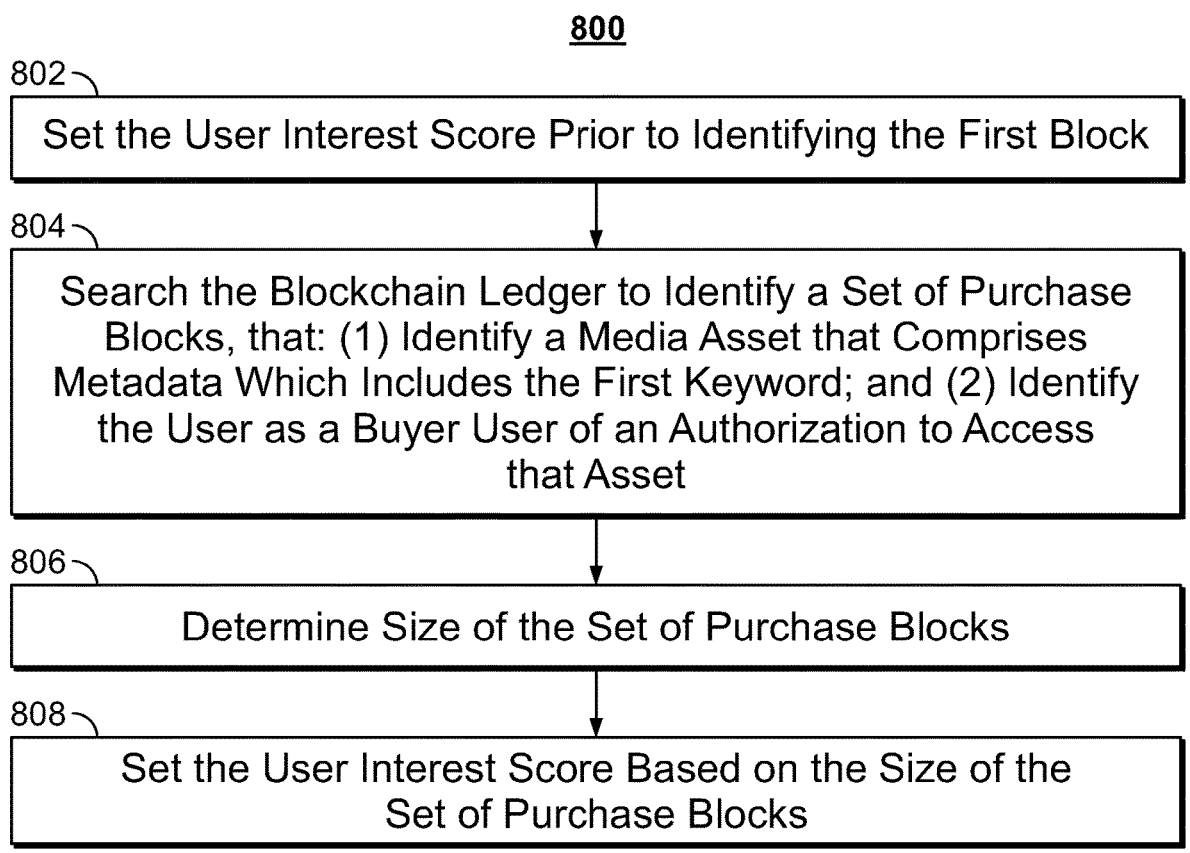
FIG. 8 depicts an illustrative flow diagram for a process of setting an interest score, in accordance with some embodiments of the disclosure.

FIG. 8 depicts an illustrative flow diagram of a process 800 for a process of setting an interest score in accordance with an embodiment of the disclosure. Process 800 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 800 occurs before step 702 of FIG. 7. For example, control circuitry 404 may perform process 800 to set the initial value for the user interest score described in relation to FIG. 7.

Process 800 begins at 802, where control circuitry 404 may set the user interest score prior to identifying the first block as described in FIG. 7. In some embodiments, control circuitry 404 may set the user interest score by performing steps 804-808. In some embodiments, the initial score may be set to 0, to 50, or to some other default value.

At 804, control circuitry 404 may search the blockchain ledger to identify a set of purchase blocks. For example, control circuitry 404 may search blockchain ledger 100 to identify all blocks that match the following criteria: they identify a media asset that comprises metadata that includes the first keyword, and they identify the user as a buyer user of an authorization to access that asset. For example, control circuitry 404 may identify blocks 104 and 114 as matching such criteria. For example, block 104 may identify a media asset, the movie "The Matrix," that has an associated metadata tag "sci-fi," and may identify the user as the buyer. In this example, block 106 may identify the media asset "Alien" that has an associated metadata tag "sci-fi," and may also identify the user as the buyer. In this case, blocks 104 and 114 may be added to the set of purchase blocks.

Process 800 continues at 806, where control circuitry 404 may determine size of the set of purchase blocks. For example, control circuitry 404 may determine that the size of the set of purchase blocks is 2, because it includes only blocks 104 and 114.

Process 800 continues at 808, where control circuitry 404 may, in response to identifying the set of purchase blocks, set the user interest score based on the size of the set of purchase blocks. For example, control circuitry 404 may use a lookup table that correlates the size of the set with an initial interest score. For example, if the size is greater than 5, the score may be set at a value of 100. In another example, if the value is equal to 2, the score may be set at a value of 60. In some embodiments, any other scheme for assigning the initial interest score based on the size of the set of purchase blocks may be used. In some embodiments, after process 800 completes, control circuitry 404 may perform process 700 to process changes in the blockchain ledger. For example, process 700 may be used to detect sales of the authorizations to access media assets previously identified by blocks of the set of purchase blocks. Accordingly, repeated iterations of process 700 may result in the interest score being decreased.

Figure 9:
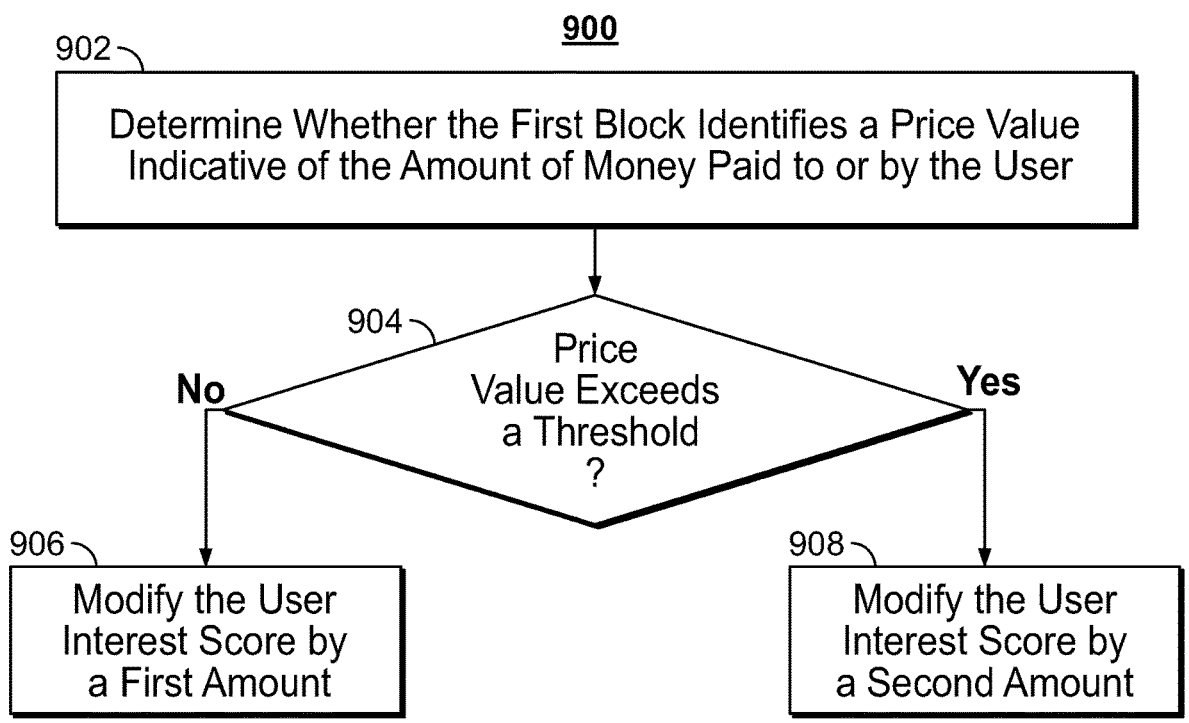
FIG. 9 depicts an illustrative flow diagram for a process of modifying the interest score, in accordance with some embodiments of the disclosure.

FIG. 9 depicts an illustrative flow diagram of a process 900 for a process of modifying the interest score in accordance with an embodiment of the disclosure. Process 900 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 900 occurs before step 718 of FIG. 7. For example, control circuitry 404 may perform process 900 to further modify the user interest score described in relation to FIG. 7.

Process 900 begins at 902, where control circuitry 404 may determine whether the first block identifies a price value indicative of the amount of money paid to or by the user. For example, block 106 may identify the sale price as $10 or $1, or any other price value.

Process 900 continues at 904, where control circuitry 404 may determine whether the price value exceeds a threshold. For example, control circuitry 404 may determine if the price value is over $5. If so, the control circuitry 404 may proceed to step 908. If the price value does not exceed the threshold, control circuitry 404 may proceed to step 906.

At 906, control circuitry 404 may modify the user interest score by a first amount. For example, since the price value is relatively high (indicating that the user still values that media asset), control circuitry 404 may reduce the user interest score by a relatively low value (e.g., by 5 points).

At 908, control circuitry 404 may modify the user interest score by a second amount. For example, since the price value is relatively low, control circuitry 404 may reduce the user interest score by a relatively high value (e.g., by 15 points). In some embodiments, this is done because the user "dumping" an authorization to view a media asset at a very low price indicates a rapid loss in interest in this and, potentially, in similar media assets.

Figure 10:
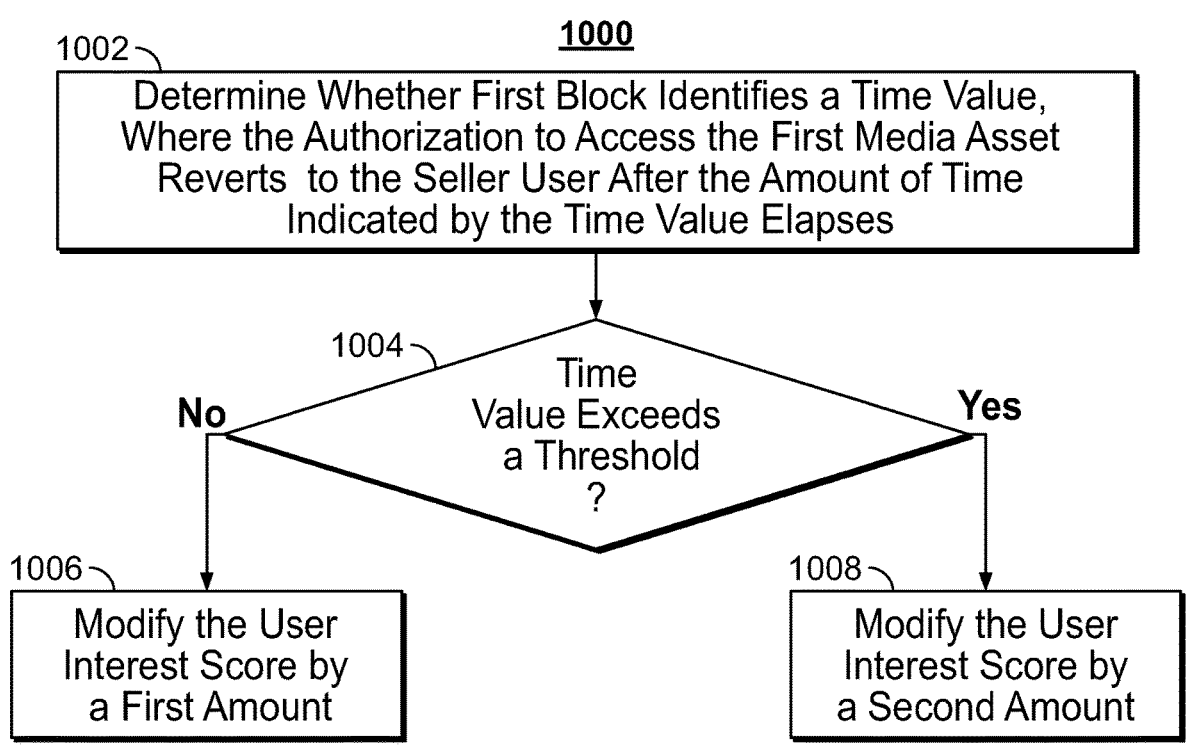
FIG. 10 depicts another illustrative flow diagram for a process of modifying the interest score, in accordance with some embodiments of the disclosure.

FIG. 10 depicts an illustrative flow diagram of a process 1000 for a process of modifying the interest score in accordance with an embodiment of the disclosure. Process 1000 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1000 occurs before step 718 of FIG. 7. For example, control circuitry 404 may perform process 1000 to further modify the user interest score described in relation to FIG. 7.

Process 1000 begins at 1002, where control circuitry 404 may determine whether the first block identifies a time value, wherein the authorization to access the first media asset reverts to the seller user after the amount of time indicated by the time value elapses. For example, block 106 may identify a time value of 2 days or 2 months after which the authorization view media asset A will revert to user UA3.

Process 1000 continues at 1004, where control circuitry 404 may determine whether the time value exceeds a threshold. For example, control circuitry 404 may determine if the time value is over 1 week. If so, the control circuitry 404 may proceed to step 1008. If the price value does not exceed the threshold, control circuitry 404 may proceed to step 1006.

At 1006, control circuitry 404 may modify the user interest score by a first amount. For example, since the time value is relatively high, control circuitry 404 may reduce the user interest score by a relatively high value (e.g., by 15 points). In some embodiments, this is done because the user being willing to loan an authorization to view a media asset for a long period of time indicates a low level of interest in this and similar media assets.

At 1008, control circuitry 404 may modify the user interest score by a second amount. For example, since the time value is relatively low, control circuitry 404 may reduce the user interest score by a relatively low value (e.g., by 5 points). In some embodiments, this is done because the user being willing to loan an authorization to view a media asset only for a short period of time indicates that the user still maintains some interest in this and similar media assets.

Figure 11:
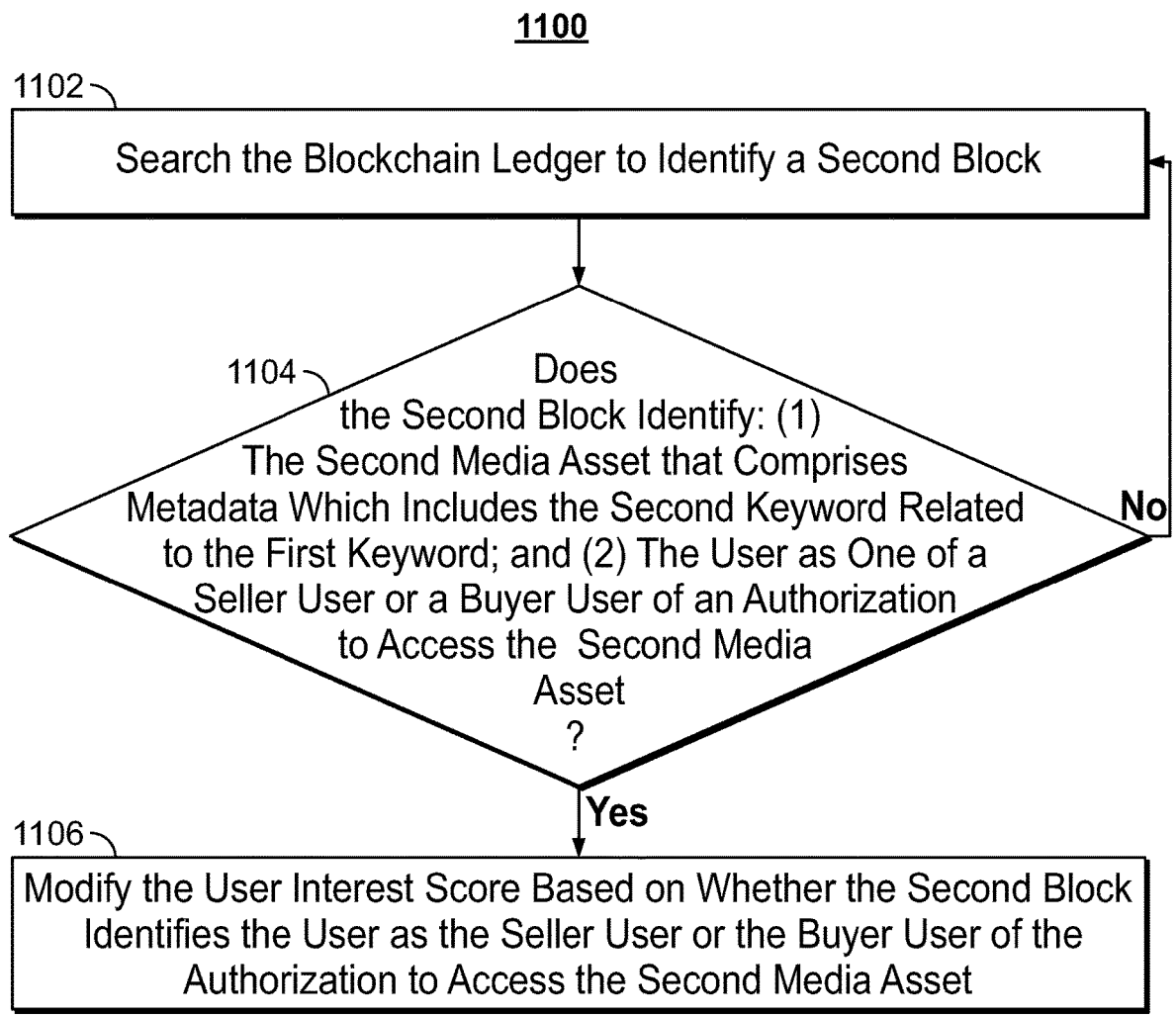
FIG. 11 depicts yet another illustrative flow diagram for a process of modifying the interest score, in accordance with some embodiments of the disclosure.

FIG. 11 depicts an illustrative flow diagram of a process 1100 for a process of modifying the interest score in accordance with an embodiment of the disclosure. Process 1100 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1100 occurs before step 718 of FIG. 7. For example, control circuitry 404 may perform process 1100 to further modify the user interest score described in relation to FIG. 7.

Process 1100 begins at 1102, where control circuitry 404 may search the blockchain ledger (e.g., ledger 100) to identify a second block. In some embodiments, the criteria for the search may require the second block to identify a second media asset that comprises metadata which includes a second keyword related to the first keyword, and identify the user as one of a seller user or a buyer user of an authorization to access the second media asset. For example, block 116 may be identified as the second if the user UB3 is the same as user UA3 and the asset B comprises metadata which includes a second keyword related to the first keyword. For example, block 166 may identify the movie "Saw". The movie "Saw" may have a "horror" tag which is related to the sci-fi tag.

Process 1100 continues at 1104, where control circuitry 404 may behave differently depending on whether the second block was identified. If the second block matching the aforenoted criteria is found, control circuitry 404 may proceed to step 1106. Otherwise, control circuitry 404 may proceed to step 1102, which may be periodically repeated.

At 1106, control circuitry 404 may modify the user interest score based on whether the second block identifies the user as the seller user of the authorization to access the second media asset or as the buyer user of the authorization to access the second media asset. For example, if control circuitry 404 determines that the user is selling authorizations to access media assets related to tag "horror," control circuitry 404 may reduce the user interest score associated with a related tag "Sci-Fi." Alternatively, if control circuitry 404 determines that the user is buying authorizations to access media assets related to the tag "horror," control circuitry 404 may increase the user interest score associated with a related tag, "sci-fi."

Figure 12:
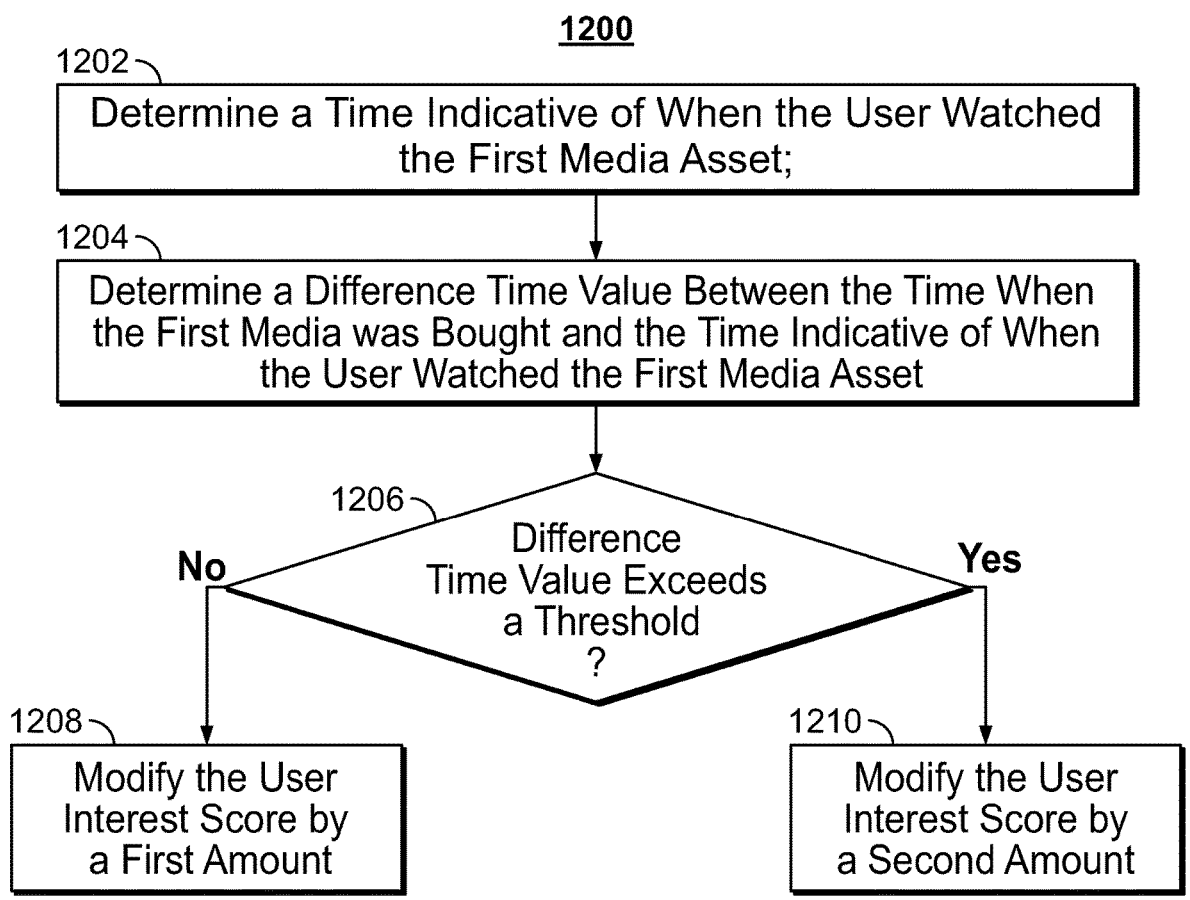
FIG. 12 depicts yet a further illustrative flow diagram for a process of modifying the interest score, in accordance with some embodiments of the disclosure.

FIG. 12 depicts an illustrative flow diagram of a process 1200 for a process of modifying the interest score in accordance with an embodiment of the disclosure. Process 1200 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1200 occurs before step 718 of FIG. 7. For example, control circuitry 404 may perform process 1200 to further modify the user interest score described in relation to FIG. 7.

Process 1200 continues at 1202, where control circuitry 404 may determine a time indicative of when the user watched the first media asset. For example, control circuitry 404 may determine that the user watched media asset (e.g., the movie "The Matrix") on Mar. 15, 2018.

Process 1200 continues at 1204, where control circuitry 404 may determine that the first block identifies a timestamp indicative of a time when the authorization to access the first media asset was transferred to the user. For example, control circuitry 404 may determine that block 104 identifies the date Mar. 1, 2018 as the date when user UA3 acquired the authorization to access media asset A. In some embodiments, control circuitry 404 may then determine a difference time value between the time identified by the timestamp and the time indicative of when the user watched the first media asset. For example, control circuitry 404 may determine that the difference between Mar. 1, 2018 and Mar. 15, 2018 is 15 days.

Process 1200 continues at 1204, where control circuitry 404 may determine whether the difference time value exceeds a threshold. For example, control circuitry 404 may determine if the time value is over 1 week. If so, the control circuitry 404 may proceed to step 1210. If the time value does not exceed the threshold, control circuitry 404 may proceed to step 1208.

At 1208, control circuitry 404 may modify the user interest score by a first amount. For example, since the difference time value is relatively low, control circuitry 404 may increase the user interest score by a relatively high value (e.g., by 15 points). In some embodiments, this is done because the user accessing a media content right after purchase indicates a high level of interest.

At 1210, control circuitry 404 may modify the user interest score by a second amount. For example, since the difference time value is relatively high, control circuitry 404 may increase the user interest score by a relatively low value (e.g., by 5 points). In some embodiments, this is done because the user accessing a media asset long after purchase indicates a low level of interest.

It is contemplated that the steps or descriptions of each of FIGS. 7-12 may be used with any other embodiment of this disclosure. It is contemplated that some steps or descriptions of each of FIGS. 7-12 may be optional and may be omitted in some embodiments. In addition, the steps and descriptions described in relation to FIGS. 7-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 7-12.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user television equipment 502, media content source 516, or media guidance data source 518.

The processes discussed above in FIGS. 7-12 are intended to be illustrative and not limiting. One skilled in the art would appreciate that the steps of the processes in FIGS. 7-12 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing media recommendations to a potential user based on analyzing a blockchain ledger, the method comprising:
    storing a potential user interest score that represents interest of the potential user in a media asset associated with a first genre keyword;
    searching the blockchain ledger that comprises a plurality of blocks, wherein each block comprises:
        an identifier of the media asset;
        an identifier of a genre keyword of the media asset;
        a cryptographic key for decrypting the media asset for consumption;
        data indicating a seller user of an authorization to access the media asset, wherein the block is configured to disallow access to the cryptographic key stored in the block to the seller user; and
        data indicating a buyer user of the authorization to access the media asset, wherein the block is configured to allow access to the cryptographic key stored in the block to the buyer user;
    wherein the searching the blockchain ledger comprises identifying a first block that comprises:
        an identifier of a first media asset and metadata for the first media asset, which includes the first genre keyword;
        a first cryptographic key for decrypting the first media asset; and
        an indication that an authorization to access the first cryptographic key for decrypting the first media asset was transferred away from the potential user to a buyer user, wherein the potential user no longer has access to the first cryptographic key stored in the first block;
    in response to identifying the first block and determining that the first block comprises the indication that the authorization to access the first cryptographic key for decrypting the first media asset was transferred away from the potential user:
        decreasing the potential user interest score that represents interest of the potential user in the media asset that is associated with the first genre keyword; and
        providing a media asset recommendation to the potential user based on the decreased potential user interest score.

2. The method of claim 1, comprising:
    setting the potential user interest score prior to identifying the first block by:
    searching the blockchain ledger to identify a set of purchase blocks, wherein each purchase block of the set of purchase blocks;
    identifies a media asset that comprises metadata which includes the first keyword; and
    identifies the potential user as a buyer user of an authorization to access that asset;
    determining a size of the set of purchase blocks;
    in response to identifying the set of purchase blocks, setting the potential user interest score based on the size of the set of purchase blocks.

3. The method of claim 1, wherein providing a media asset recommendation to the potential user based on the potential user interest score further comprises:
    determining whether the potential user interest score corresponds to a threshold, and
    in response to determining that the potential user interest score corresponds to the threshold, providing the media asset recommendation to the potential user, wherein the media asset recommendation comprises recommending a second media asset related to the first keyword.

4. The method of claim 1, wherein the first block comprises a price value indicative of the amount of money paid by the potential user.

5. The method of claim 4, the method further comprising:
    determining whether the price value exceeds a threshold;
    in response to determining that the price value does not exceed the threshold, modifying the potential user interest score by a first amount; and
    in response to determining that the price value exceeds the threshold, modifying the potential user interest score by a second amount.

6. The method of claim 1, wherein the first block comprises a time value, wherein the authorization to access the first media asset reverts to the seller user after the amount of time indicated by the time value elapses.

7. The method of claim 6, further comprising:
    determining whether the time value exceeds a threshold;

in response to determining that the time value does not exceed the threshold, modifying the potential user interest score by a first amount; and in response to determining that the time value exceeds the threshold, modifying the potential user interest score by a second amount.

8. The method of claim 1, further comprising:
searching the blockchain ledger to identify a second block, wherein the second block:
   identifies a second media asset that comprises metadata that includes a second keyword related to the first keyword; and
   identifies the potential user as one of a seller user or a buyer user of an authorization to access the second media asset; and
   in response to identifying the second block, modifying the potential user interest score based on whether the second block identifies the potential user as the seller user of the authorization to access the second media asset or as the buyer user of the authorization to access the second media asset.

9. The method of claim 1, wherein the first block comprises a timestamp indicative of a time when the authorization to access the first media asset was transferred to the potential user.

10. The method of claim 9, further comprising:
determining a time indicative of when the potential user watched the first media asset;
determining a difference time value between the time identified by the timestamp and the time indicative of when the potential user watched the first media asset;
determining whether the difference time value exceeds a threshold;
in response to determining that the difference time value does not exceed the threshold, modifying the potential user interest score by a first amount; and
in response to determining that the difference time value exceeds the threshold, modifying the potential user interest score by a second amount.

11. The method of claim 1, wherein the media asset recommendation is for an asset of a different genre than the first genre.

12. A system for providing media recommendations to a potential user based on analyzing a blockchain ledger, the system comprising:
   a processor;
   a memory storing computer readable instructions that when executed by the processor causes the processor to perform the steps of:
      storing a potential user interest score that represents interest of the potential user in a media asset associated with a first genre keyword;
      searching a blockchain ledger that comprises a plurality of blocks, wherein each block comprises:
         an identifier of the media asset;
         an identifier of a genre keyword of the media asset;
         a cryptographic key for decrypting the media asset for consumption;
         data indicating a seller user of an authorization to access the media asset, wherein the block is configured to disallow access to the cryptographic key stored in the block to the seller user; and
         data indicating a buyer user of the authorization to access the media asset, wherein the block is configured to allow access to the cryptographic key stored in the block to the buyer user;
      wherein the searching the blockchain ledger comprises identifying a first block that comprises:
         an identifier of a first media asset and metadata for the first media asset, which includes the first genre keyword;
         a first cryptographic key for decrypting the first media asset; and
         an indication that an authorization to access the first cryptographic key for decrypting the first media asset was transferred away from the potential user to a buyer user, wherein the potential user no longer has access to the first cryptographic key stored in the first block;
      in response to identifying the first block and determining that the first block comprises the indication that the authorization to access the first cryptographic key for decrypting the first media asset was transferred away from the potential user:
         decreasing the potential user interest score that represents interest of the potential user in the media asset that is associated with the first genre keyword; and
         providing a media asset recommendation to the potential user based on the decreased potential user interest score.

13. The system of claim 12, the memory storing computer readable instructions that when executed by the processor further causes the processor to perform the steps of:
setting the potential user interest score prior to identifying the first block by:
   searching the blockchain ledger to identify a set of purchase blocks, wherein each purchase block of the set of purchase blocks;
   identifies a media asset that comprises metadata which includes the first keyword; and
   identifies the potential user as a buyer user of an authorization to access that asset;
determining size of the set of purchase blocks;
in response to identifying the set of purchase blocks, setting the potential user interest score based on the size of the set of purchase blocks.

14. The system of claim 12, wherein providing a media asset recommendation to the potential user based on the potential user interest score further comprises:
determining whether the potential user interest score corresponds to a threshold, and
in response to determining that the potential user interest score corresponds to the threshold, providing the media asset recommendation to the potential user, wherein the media asset recommendation comprises recommending a second media asset related to the first keyword.

15. The system of claim 12, wherein the first block comprises a price value indicative of the amount of money paid to or by the potential user.

16. The system of claim 15, the memory storing computer readable instructions that when executed by the processor further causes the processor to perform the steps of:
determining whether the price value exceeds a threshold;
in response to determining that the price value does not exceed the threshold, modifying the potential user interest score by a first amount; and
in response to determining that the price value exceeds the threshold, modifying the potential user interest score by a second amount.

17. The system of claim 12, wherein the first block comprises a time value, wherein the authorization to access the first media asset reverts to the seller user after the amount of time indicated by the time value elapses.

18. The system of claim 16, the memory storing computer readable instructions that when executed by the processor further causes the processor to perform the steps of:
- determining whether the time value exceeds a threshold;
- in response to determining that the time value does not exceed the threshold, modifying the potential user interest score by a first amount; and
- in response to determining that the time value exceeds the threshold, modifying the potential user interest score by a second amount.

19. The system of claim 12, the memory storing computer readable instructions that when executed by the processor further causes the processor to perform the steps of:
- searching the blockchain ledger to identify a second block, wherein the second block:
  - identifies a second media asset that comprises metadata that includes a second keyword related to the first keyword; and
  - identifies the potential user as one of a seller user or a buyer user of an authorization to access the second media asset; and
- in response to identifying the second block, modifying the potential user interest score based on whether the second block identifies the potential user as the seller user of the authorization to access the second media asset or as the buyer user of the authorization to access the second media asset.

20. The system of claim 12, wherein the first block comprises a timestamp indicative of a time when the authorization to access the first media asset was transferred to the potential user.

21. The system of claim 19, the memory storing computer readable instructions that when executed by the processor further causes the processor to perform the steps of:
- determining a time indicative of when the potential user watched the first media asset;
- determining a difference time value between the time identified by the timestamp and the time indicative of when the potential user watched the first media asset;
- determining whether the difference time value exceeds a threshold;
- in response to determining that the difference time value does not exceed the threshold, modifying the potential user interest score by a first amount; and
- in response to determining that the difference time value exceeds the threshold, modifying the potential user interest score by a second amount.

* * * * *